March 12, 1963 H. A. CHENEY ET AL 3,081,289
POLYMERIZATION APPARATUS AND METHOD
Filed April 27, 1959 2 Sheets-Sheet 1

INVENTORS
HARRY A. CHENEY
CHARLES A. SLEICHER, JR.
BY *Martin S. Baer*
THEIR ATTORNEY INVENTORS
HARRY A. CHENEY
CHARLES A. SLEICHER, JR.
BY *Martin S. Baer*
THEIR ATTORNEY

United States Patent Office 3,081,289
Patented Mar. 12, 1963

3,081,289
POLYMERIZATION APPARATUS AND METHOD
Harry A. Cheney and Charles A. Sleicher, Jr., Berkeley, Calif., assignors to Shell Oil Company, a corporation of Delaware
Filed Apr. 27, 1959, Ser. No. 809,056
2 Claims. (Cl. 260—93.7)

This invention relates to an apparatus particularly adapted for carrying out polymerization reactions and to a method for carrying out polymerization reactions. The apparatus and method of this invention are particularly adapted for the production of polypropylene.

It is now known that alpha-monoolefins can be polymerized at low temperatures and low pressures to produce polymer which is linear in structure. The methods for carrying out such polymerizations are generically referred to as "low pressure" methods and the polymer thus produced is termed "crystalline," "low pressure" or "linear" polymer. The low pressure polymer is produced by employing any of a variety of catalysts which are called "low pressure" or "Ziegler type" catalysts.

A particularly useful linear polymer of this type is polypropylene. The commercial production of polypropylene has, to date, been carried out in a batch reaction system in which propylene is gradually introduced into a liquid slurry of suitable catalyst in hydrocarbon liquid and propylene addition is continued until a relatively thick slurry of polypropylene solids in hydrocarbon liquid is obtained. The reactor is then opened and the solid polypropylene is removed, separated and purified. A new batch of catalyst slurry and hydrocarbon liquid is placed into the reactor and propylene addition again commenced.

The production of polypropylene and related linear polymers is complicated by the fact that the reaction mixture is a slurry of catalyst and product solids in a liquid hydrocarbon medium. The solids content of the slurry settles rapidly when not agitated. However, it is essential that the solids remain substantially evenly distributed throughout the slurry in order to maintain proper reaction conditions. In some reaction systems the polymer particles tend to adhere to surfaces of the reactor, resulting in the formation of obstructing films. The problem is aggravated by the fact that there are substantial disadvantages in using agitators. Agitators provide surfaces that are easily fouled and difficult to clean; debris from the packings of agitator shafts causes undesirable contamination of the polymer product. Furthermore, the catalysts employed in low pressure polymerizations are pyrophoric materials, i.e., materials which ignite spontaneously upon contact with oxygen. Hence it is extremely undesirable to provide such reactors with agitators having packings that may be in contact with the liquid contents of the reactor, because any leak to the outside of the reactor may cause a serious fire.

In the low pressure polymerization processes such as the production of polypropylene, it has been previously suggested to provide agitation by means of a gas stream. However, it has been found that it is extremely difficult to maintain an even agitation of a slurry such as that occurring in this reaction by means of a gas stream. The difficulty is overcome by providing means for dividing the liquid space of the reactor into compartments in which slurry circulates, substantially in the manner to be described.

It is an object of this invention to provide a process for carrying out a continuous polymerization of alpha-monoolefins under low pressure. It is a specific object to provide an improved method for carrying out the low pressure polymerization of propylene to linear polypropylene.

These and other objects are accomplished by providing a polymerization reactor comprising a chamber including a liquid space in the lower part thereof and a vapor space in the upper part thereof, means dividing said liquid space into at least two vertically-oriented substantially separate compartments in liquid communication with each other both above and below said dividing means, gas-dispersing means adapted to disperse a substantial stream of gas selectively into the lower part of at least one but less than all of said compartments, a gas inlet communicating with said gas-dispersing means, at least one vapor outlet from said vapor space, and means for placing liquid or slurry into and for removing liquid or slurry from said liquid space; more preferred, the reactor comprises a gas inlet communicating with gas-dispersing means adapted to disperse a substantial stream of gas into the lower part of each of said compartments, flow control means for said gas-dispersing means adapted to selectively direct a substantial flow of gas to at least one but less than all of said dispersing means while directing no more than a small flow of gas to the remaining dispersing means, at least one vapor outlet from said vapor space and at least one liquid or slurry inlet to and one liquid or slurry outlet from said liquid space.

In its essential form, the process of the present invention is a method for carrying out a polymerization reaction in which the reaction mixture contains both small solid particles and a liquid of relatively low density, which method comprises establishing a reaction slurry in a circuit oriented in a substantially vertical plane, continuously introducing a stream of gas into the lower part of at least one vertical conduit of said circuit to cause up-flow of slurry therein, resulting in circulation of said slurry through said circuit, and withdrawing gas from a vapor space communicating with the uppermost portion of said circuit.

In the total process of polymerization of alpha-monoolefins, the present invention is only concerned with the polymerization reactor itself and with a method of operating a polymerization reactor. Reactants, catalysts and conditions known to the prior art in the production of linear polymers of alpha-monoolefins such as described, for example, in Belgian Patents Nos. 534,792, and 538,782, to Ziegler and Ziegler et al., respectively, are suitably employed in the process of the present invention.

Briefly stated, a suitable process for the polymerization of alpha-monoolefins for the production of crystalline or linear polymer in which this invention may be employed includes the steps, in combination, comprising polymerizing a mixture of olefin, catalyst and inert diluent, the mixture being substantially free of air and water, the catalyst being prepared by mixing an organo-aluminum compound and a strong reducing agent, the polymerization being at temperatures ranging from about 90° to about 200° F., cooling the polymerization mixture during the polymerization, continuously recovering a polymer slurry in hydrocarbon solvent, mixing the polymer slurry with a lower alcohol at elevated temperatures whereby the catalyst residues are decomposed, washing the thus prepared slurry with an aqueous solution of mineral acid, separating the polymer as a slurry and subjecting it to at least one washing with an aqueous base, and spray drying the polymer slurry.

A certain few catalyst compositions are particularly suitable in the low pressure methods because they produce high yields of polymer which have higher proportions of crystallinity in addition to which the molecular weight may be controlled as desired. Suitable low pressure catalysts are represented by those that are prepressure catalysts are represented by those that are prepared from at least two components within one of groups A and B as follows:

A. The reaction product of (1) a compound of a transition metal selected from Groups IVa, Va, and VIa of the Mendeleev Periodic Table, as illustrated on page 28 of Ephraim, "Inorganic Chemistry," 6th English edition, and manganese with (2) a compound of the formula $R_1R_2AlX$ wherein $R_1$ and $R_2$ each are selected from the group consisting of hydrogen and hydrocarbon and X is selected from the group consisting of hydrogen, halogen, alkoxy, aryloxy, the residue of a secondary amine, amide, mercaptan, thiophenol, carboxylic acid and sulfonic acid.

B. The reaction product of (1) a compound of a transition metal from Groups IVa, Va, and VIa of the Mendeleev Periodic Table and manganese with (2) a compound selected from the group consisting of aluminum trialkyl, magnesium alkyl, zinc alkyl and Grignard compound.

Particularly preferred catalysts are those selected from the reaction product of a group IVa metal halide such as zirconium trichloride, titanium trichloride, and the like, and an aluminum dialkyl halide or aluminum trialkyls, or mixtures thereof, with the last being more preferred. Representative aluminum alkyls include, for example, aluminum diethyl chloride, aluminum diethyl bromide, aluminum triethyl, aluminum triisobutyl, aluminum triisopropyl and others wherein the alkyl radicals have from one to ten carbon atoms, as aluminum trinonyl, and the like. In general, low pressure catalysts are said to include the reaction production of a compound of a group IV–VI transition metal and a strong reducing agent.

In the interest of simplicity and clarity the description of the invention, for the most part, will be confined to a discussion of propylene polymerization. Various modifications of apparatus and processing conditions will be pointed out but it should be understood that the invention is not confined to such descriptive matter, as will be understood by persons skilled in the art.

The present invention will be further described by reference to the drawing, wherein.

Figure 1:
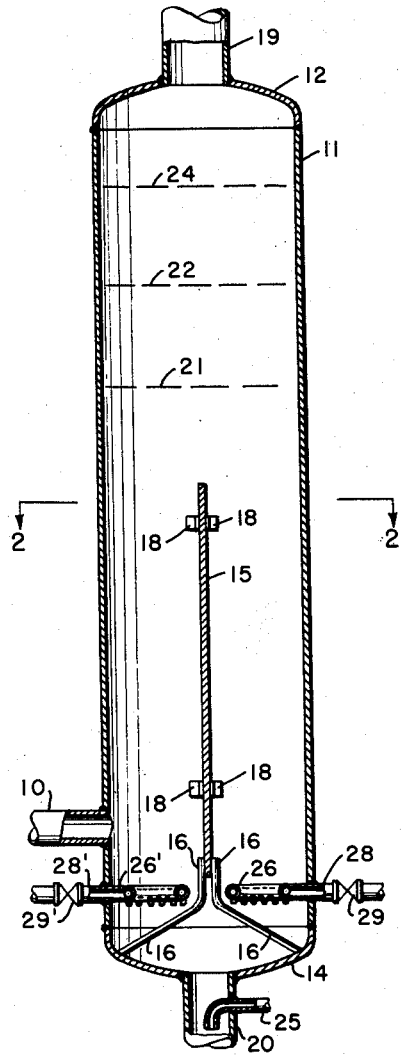
FIG. 1 is a section, in elevation, of one apparatus useful in the process of the present invention.

Referring to FIG. 1, this represents a reactor consisting essentially of a cylindrical shell 11 having dished heads 12 and 14 and a baffle 15 which divides the major portion of the liquid space of the reactor into two vertical compartments.

The lowermost limit at which the liquid level is desirably maintained during operation of the apparatus is shown by dashed line 21. This level is about one-half reactor diameter above the top of baffle 15. A suitable average liquid level is shown by dashed line 22 which is one reactor diameter above the top of baffle 15. An upper liquid level which is preferably not exceeded is shown by dashed line 24 which is about one-half reactor diameter below the top of dished head 12.

Figure 2:
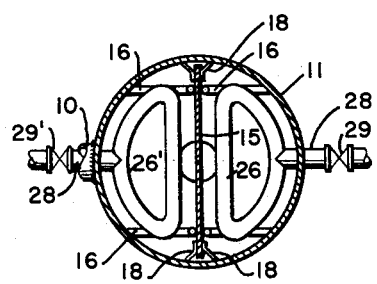
FIG. 2 is a horizontal section through the apparatus of FIG. 1 taken at plane 2—2.
Figure 3:
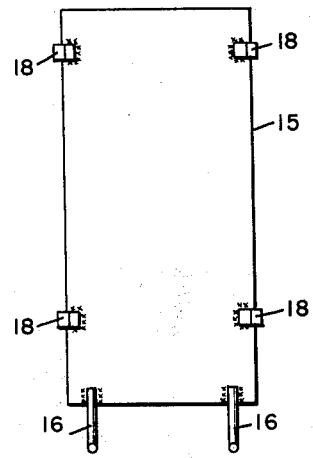
FIG. 3 is a drawing in elevation of the partition means in FIG. 1.
Figure 5:
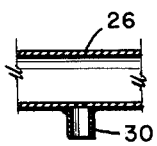
FIG. 5 is a further detail of a single gas outlet orifice of the gas disperser of FIG. 4.
Figure 4:
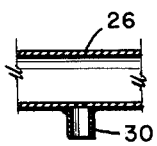
FIG. 4 is a detail drawing showing the gas-dispersion means of the apparatus of FIG. 1.

Although baffle 15 may be rigidly affixed to the reactor, it is suitably placed therein without being rigidly affixed. As shown, the baffle rests on legs 16 which are affixed to the lower corners of the baffle and are suitably angled out in such a manner as to rest near the weld level of the dished head. The spacing of the baffle throughout the length of the reactor is maintained by arms 18 which may be affixed at various heights along the baffle and which rest against the reactor shell. This is further illustrated by reference to FIG. 2 which shows a cross section of the reactor and FIG. 3 which shows a detailed elevational view of the baffle. As shown, baffle 15 does not fit tightly against the reactor wall. The clearance at each side may be as much as one-tenth of the reactor diameter without causing excessive loss of circulation due to by-passing from one compartment of the conduit to the other. Of course, the baffle may fit tightly against the reactor wall if desired.

Although reactor shell 11 is shown as of single welded construction, it is generally preferable to affix the lower and/or upper heads by means of flanges. This permits easy removal of the reactor heads and removal of the baffle from the reactor if internal maintenance becomes desirable.

As illustrated in FIG. 1 there is an outlet 19 from the vapor space and an outlet 20 from the bottom of the liquid space. If desired, outlets 19 and/or 20 may be located in the side of the reactor rather than at ends thereof. In the particular illustrated version, a small gas inlet pipe 25 is provided which is adapted to bleed a small stream of gas into the bottom outlet, if desired, to break up any congestion of solid material which might occur therein. A liquid inlet 10 is also provided. This may be located in the side, as shown, or at or near the bottom. Multiple inlets or outlets may be provided if desired.

An essential component of the apparatus according to the present invention are gas-dispersing devices 26 and 26′ which are fed by gas inlets 28 and 28′ controlled by valves 29 and 29′. In the ordinary operation of the apparatus of FIG. 1 only one of the gas dispersers 26 and 26′ is on-stream at any one time. This causes gas to flow up in the compartment on the side of the baffle on which the disperser is located. As a consequence of this up-flow of gas, the density of the fluid column in said compartment is lower than the density of the fluid column in the opposite compartment and the result is that fluid circulates up through one compartment, across the baffle and down through the other compartment, and is returned below the baffle back to the compartment into which gas is added. While the gas disperser in the downflow compartment is not on-stream it is nevertheless desirable to bleed a small amount of gas through it continuously to keep it free from liquid and polymer. This gas bleed may be one-tenth of the total gas flow or less, e.g., as little as one-hundredth of the total. The shape of gas-dispersing means 26 and 26′ is not critical. A particularly suitable modification of gas disperser is illustrated by FIGS. 1, 2, 4 and 5. In this modification, a pipe loop is provided into which there are drilled a number of small holes in the bottom-side of the loop. The diameter of these holes is chosen to be appropriate to the desired gas flow. It is usually in the range from 0.05 to 0.5 inch. The diameter is selected sufficiently small so that the pressure drop across each hole is substantially greater than the pressure drop due to friction within the disperser pipe itself but sufficiently large that the total pressure drop does not result in prohibitive pumping costs. Over each hole, there is welded a small pipe nipple 30 of at least somewhat larger diameter than the hole. By virtue of this arrangement, liquid slurry is prevented from entering the pipe loop itself or plug the holes therein, even when the main flow of gas is discontinued, particularly if a trickle of gas continues to flow.

The main purpose of providing two separate gas-dispersing means, one in each compartment, is to provide a means for loosening aggregations of the solid components of the slurry which may occur in the lower section of the reactor if at any time gas flow is discontinued for a significant period of time. In such event, when the reaction is to be resumed gas is added through both dispersers 26 and 26', resulting in up-flow of gas in both compartments and in a reconstitution of a relatively evenly distributed slurry. A second purpose is to permit periodic reversal of flow during operation so that the much higher turbulence of the gas side will help to loosen polymer that might collect on the baffle or vessel walls.

Figure 6:
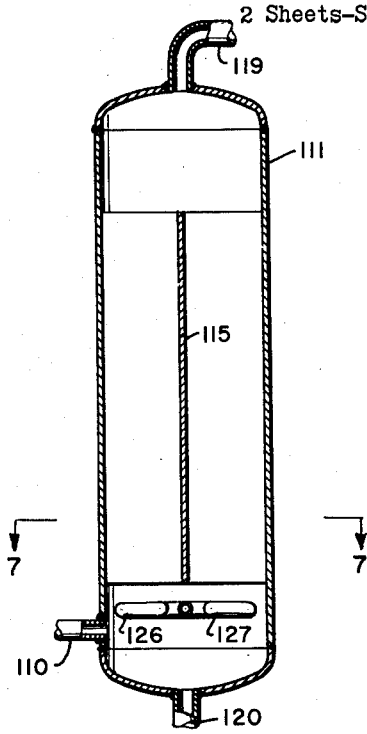
FIG. 6 is a front sectional elevation of a modified form of reactor useful in the process of this invention.
Figure 7:
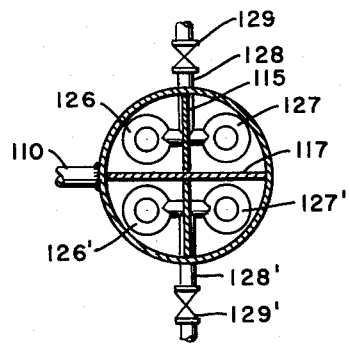
FIG. 7 is a horizontal section through the reactor of FIG. 6 at plane 7—7.

FIG. 6 illustrates a reactor which is essentially similar to the reactor of FIGS. 1–5 but which is divided into four compartments rather than two compartments. As shown, reactor vessel 111 is a cylindrical vessel having vapor exit line 119 and liquid exit line 120, similar to outlets 19 and 20 of FIG. 1 and liquid inlet 110, similar to inlet 10 of FIG. 1. The liquid space is divided into four compartments by baffle 115 which is vertical to the plane of the drawing and baffle 117 which lies in the plane of the drawing. FIG. 7 represents a cross section of the apparatus of FIG. 6 at plane 7—7. It illustrates the position of baffles 115 and 117 and shows in more detail gas dispersers 126, 127, 126' and 127'. These dispersers are connected to gas inlets 128 and 128', respectively, controlled by valves 129 and 129'. As illustrated, dispersers 126 and 127 are both controlled by valve 129 and 126' and 127' by valve 129'. If desired, separately controlled gas inlet means can be provided for each compartment.

Figure 8:
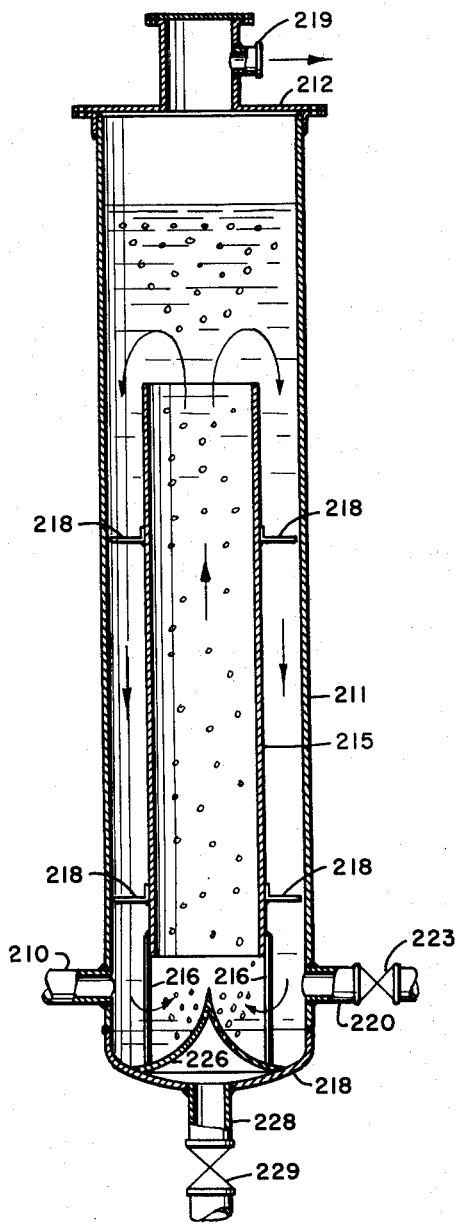
FIG. 8 is a front sectional elevation of a third modification of a reactor useful in the process of this invention, which also illustrates schematically the method of operation.

FIG. 8 illustrates a further modification of the apparatus of this invention. FIG. 8 shows, in elevation, a reactor vessel 211 which is a cylindrical vessel with flanged head 212 and dished bottom 214, provided with an internal tube 215 which is concentric with the reactor vessel and serves to delimit the compartments of the liquid space. One compartment of the liquid space is the inner volume of tube 215 and the other is an annulus defined by tubular baffle 215 and reactor shell 211. Baffle 215 may be rigidly affixed in the reactor space or, as shown, it may be loosely placed therein, supported on legs 216 and maintained concentric with the reactor wall by spacers 218, which may be short sections of pipe or metal rods. Reactor 211 is provided with a gas inlet 228, controlled by valve 229, and communicating with gas-dispersing plate 226. The gas-dispersing plate may be a flat plate, placed across the bottom of the reactor and provided with a sufficient number of holes to permit flow of gas up through the center of the reactor and into baffle tube 215. Preferably, it is shaped somewhat like a cone and provided with holes only in the central portion thereof, as illustrated by plate 226. Plate 226 provides guidance for the up-flowing gas and prevents accumulation of solids in the bottom of the reactor due to the down-flow of slurry in the outer annulus.

The reactor is further provided with a liquid-retaining section above the upper end of baffle 215. If desired, the section may be extended in a narrower tubular portion of the reactor to provide flexibility for variation in the liquid level in the reactor without excessive liquid holdup. A vapor space is provided above the liquid space. There is a gas outlet 219 communicating with the vapor space above the liquid space of the reactor, and a liquid outlet 220, controlled by valve 223. A liquid inlet 210 is also provided.

A process which is particularly adapted to be carried out in the reactors as illustrated in the drawing is the low pressure conversion of propylene to linear polypropylene. This will be further illustrated by reference to FIG. 8. In the continuous operation in which the reactor has been on-stream for a sufficient period of time to provide steady-state operation, additional liquid, propylene-containing feed enters the reactor continually via line 210. The feed suitably contains admixed therewith a proportion of a suitable low pressure polymerization catalyst, which is ordinarily present in the form of a slurry of finely-divided material. The rate of feed addition is relatively low so that the total residence time of feed in the reactor is in the range from 6 to 12 hours, i.e., the amount of fresh liquid feed added per hour is preferably from about ⅙ to 1/12 the volume of the reactor, including the volume contained within tubular baffle 215.

The pressure maintained in reactor 211 is preferably in the range from about 50 p.s.i.a. to about 500 p.s.i.a., with pressure of the order of about 200 p.s.i.a. being preferred. Higher pressures, i.e., in the order of 500 p.s.i.a. or more, may be employed but are generally not recommended because they increase the hazards and expenditures of capital required to provide the reactor without corresponding improvements in the process. The polymerization reaction is exothermic so that heat is liberated in the reactor during the course of the reaction. In some measure the amount of heat liberated depends upon the relative activity of the selected catalyst. Heat-exchange means, such as external heating jackets for the reactor, may be provided to remove part or all of the heat of reaction, but internal heat-exchange surface is generally avoided because it provides additional surface which may be fouled in the course of the reaction. The reactors according to the present invention are particularly adapted to carry out the reaction without provision of internal heat-exchange surfaces.

Heat removal in the process of this invention is preferably supplied by evaporative cooling. The heat removal medium in propylene polymerization may be a lower hydrocarbon than propylene, e.g., specifically ethane, or it may be propane or it may be a vaporizable hydrocarbon, such as butane or isopentane. The pressure in the reactor is maintained by a valve, not shown, in line 219, at a value which permits evaporation of the solvent present in the reactor. The temperature maintained in the reactor is suitably in the range from about 90° to about 200° F.

The propylene feed stream entering the reactor may contain any desired proportion of monomer, propane and solvent. It may contain from about 5 to about 50 mole percent of propylene with about 15 to 25% being preferred. The remainder of the feed is an inert hydrocarbon solvent, e.g., propane, butane, pentane, heptane, octane, gasoline, or other low-boiling liquid hydrocarbon. Propane is generally present in substantially larger amounts if it is the component which is chosen to provide cooling and may in that event range from 30 to 90 mole percent of the total with about 40 mole percent being representative of a more preferred amount. A normally liquid solvent which is higher boiling than the solvent that provides the main amount of cooling may be entirely absent or it may be present in amounts up to 60 mole percent with amounts in the order of about 50 mole percent being suitable to provide smooth transfer of slurry in the lines and assist in the cooling. If normally liquid solvent is not present then propane will function additionally as a solvent.

Special care is usually taken to provide a feed of very high degree of purity, i.e., freedom from contaminating material such as water and oxygen and compounds which destroy catalyst.

The feed stream may also contain various additives that have particular functions relating to the control of the polymer quality. Such additives may have the effect of lowering or raising the molecular weight of the polymer and include for example hydrogen, acetylene, ethers, esters, amines and other compounds having active hydrogen atoms. The need or desirability for such additives varies a great deal and depends mainly on the catalyst choice, and generally they are not essential. However, they can be used advantageously at times and in the case of propylene polymerization hydrogen is particularly useful while compounds having active hydrogen, particularly acetylene, are better for ethylene polymerization. If hydrogen addition is desired, that gas is also suitably added to the feed stream entering through line 210 or it may be added to the gas stream entering through line 228. A separate line for hydrogen addition may be provided if desired.

While the reactor is in operation liquid evaporates out of the reaction mixture into the vapor space and is removed via line 219 to separation equipment not shown. Suitably any relatively higher-boiling components are removed from the vapor in line 219 by condensation and the vapor is compressed to a somewhat higher pressure and returned to the reactor through line 228 controlled by valve 229. In the preferred method of operation, this vapor consists largely of propane and propylene. The vapor passes through distributor plate 226 and is broken up into bubbles which pass upwardly through the inner compartment defined by tube 215. By virtue of the presence of a substantial amount of gas in said compartment the density of the gas-liquid-solids mixture therein is lowered and slurry flows upwardly in said compartment and passes out of the compartment at the top thereof. Gas is disengaged at the top and rises into the vapor space. The density of the liquid slurry in the annular compartment is higher and this slurry consequently flows downwardly and enters the compartment defined by tube 215 at the bottom thereof. Thus there is a continuous circulation of liquid slurry upwardly through the inner compartment and downwardly through the outer annular compartment. The circulating liquid slurry contains finely-divided catalyst and finely-divided particles of the solid polypropylene polymer in a substantially even distribution of solids throughout the liquid space.

In a continuous operation, slurry is withdrawn continually, i.e., continuously or intermittently, through line 220 controlled by valve 223. As illustrated, valve 223 is a remote-control valve. It is generally found that where very small streams of slurry are to be withdrawn over a long period of time it is preferred to maintain valve 223 closed most of the time and to open it wide periodically for short intervals to permit substantial surges of slurry to be withdrawn, thus preventing deposition of solids in the liquid outlet and valve.

The thickness of the slurry in the reactor may be widely varied. The solids content may be from 3 to 30% by weight. It is suitably about 20% by weight.

The density of the liquid in the process according to this invention is generally in the range from 0.5 to 0.8. The skeletal density of the polymer may be about 1.6. The setting rate of catalyst and polymer is usually 0.2 ft./sec. or less. It is determined not only by the relative densities but also by the configuration of polymer and catalyst particles. The rate of flow of liquid in each compartment is usually about 0.8 to 1.0 ft./sec., but may be as low as 0.5 and as high as 2 ft./sec. These relationships easily satisfy the condition that the rate of rise of liquid in the up-flow compartment be substantially greater than the settling rate of the solids.

In the present invention, certain relationships of reactor dimensions and of flow rates during operation of the process are important. In designing the apparatus it is preferred to make provision that the cross-sectional areas of the compartments in which liquid flows in opposite directions are approximately equal. In the reactor such as illustrated by FIG. 8 it may sometimes be desirable that the cross-sectional area of the annular space be slightly larger than that of the tubular space because the annular space has more surface friction. The larger the reactor, however, the less important this difference becomes, and in reactors of two feet diameter or more, the cross sectional areas are suitably of substantially equal size. A useful range for the ratio of cross-sectional area is between 0.8:1 and 1.2:1; in general it is not desirable to have the total cross-sectional area of compartments in which flow is in one direction more than two times as great as the cross-sectional area of compartments in which flow is in the opposite direction.

In order to provide for substantial and unobstructed circulation of the slurry from one compartment into the other it is desirable that the liquid space above the baffle and the liquid space below the baffle in a vessel of circular cross section be in each event at least about equal to the radius of the reactor vessel. In general, the distance between the lower end of the baffle and the reactor bottom and between the upper end of the baffle and the top of the liquid space should each be at least about one-half reactor radius and preferably at least one reactor radius. The space above the baffle may be two or three reactor radii or more. It is desirable that the compartments be relatively elongated, e.g., that the ratio of length to the square root of the cross sectional area of the compartment be at least about 1:1 and preferably from 2:1 to 10:1. It may be greater, e.g., 15:1.

In the operation of the apparatuses of this invention it is desirable to maintain at least a sufficient flow rate of gas through the compartment in which a substantial amount of gas flows up to maintain a substantially evenly distributed slurry. It is sometimes desirable to have a gas rate as high as can be maintained without causing entrainment of liquid with the gas leaving the reactor or entrainment of a substantial amount of gas into the slurry flowing down in the down-flowing compartment. It has been found that in systems such as those which occur in polymerization of alpha-monoolefins a superficial gas velocity of about 0.6 foot per second should not be exceeded. The superficial gas velocity is the value which is calculated assuming that the compartment in which the gas is flowing is filled only with gas and contains no liquid or solid material. The numerical value of the superficial velocity in feet per second is the same as the volume of gas in cubic feet per second per square foot of cross-sectional area of the compartment. Superficial velocities in the process of this invention are preferably less than 0.6 ft./sec. The preferred range is between 0.02 and 0.2 ft./sec. and values in the neighborhood of 0.08 ft./sec. are particularly preferred.

The hold-up time of reactant in the process of the present invention is relatively long and consequently the flow of fresh feed to the reaction zone is a relatively small proportion of the liquid present in the reactor at any one time and is not sufficient to provide any substantial motive force. The gas passing into the reactor, e.g., through line 228 of FIG. 8, as has been previously stated, is preferably recirculated gas removed from the reactor through line 219 and thus contains a substantial proportion of propylene as well as propane, if the latter is employed as coolant fluid, or of whatever other coolant fluid is present in the reaction. If desired, inert gas may be added to the gas entering through line 228 or the gas may consist entirely of inert gas while any valuable hydrocarbons present in the reactor effluent 219 are recovered or passed to another reactor.

We claim as our invention:

1. A method for carrying out a polymerization reaction which results in a slurry of small solid particles in a liquid of relatively low density, which comprises establishing in a single reactor a vapor zone above a liquid zone which is partitioned into at least two substantially separate compartments which are in liquid communication with each other both above and below said partition, maintaining a catalyst-containing reaction mixture slurry in said liquid zone, introducing a substantial dispersed stream of gas into at least one, but less than all, of said compartments whereby the slurry content of each compartment into which gas is flowing is caused to rise in said compartment, flow into another compartment over the top of said partition, descend in said other compartment and flow back into each of said compartments into which said substantial dispersed stream of gas is introduced, continuously introducing said gas, withdrawing gas from said vapor zone, and withdrawing slurry from said liquid zone.

2. A continuous method for polymerizing propylene to a high molecular weight solid polymer by containing propylene with a catalyst comprising the reaction product of a metal compound selected from a group consisting of compounds of group IV–VI transition metals and a strong reducing agent, which comprises establishing a reaction slurry containing up to 30% by weight, of solids, including said catalyst, in a liquid phase comprising propylene and a light saturated hydrocarbon of up to eight carbon atoms per molecule at ebullition conditions in a circuit oriented in a substantially vertical plane, the two vertical conduits of said circuit being of substantially equal cross-sectional area, continuously introducing a dispersed stream of gas upwardly into one vertical conduit of said circuit at a superficial velocity of no more than about 0.6 ft./second, causing up-flow of slurry therein, resulting in circulation of said slurry through said circuit with downflow of slurry in the other vertical conduit of said circuit, withdrawing gas from a vapor space communicating with the uppermost portion of said circuit, continuously feeding sufficient propylene to said slurry to maintain a desired rate of reaction and continually withdrawing a bleed stream of slurry and recovering polypropylene therefrom.

References Cited in the file of this patent

UNITED STATES PATENTS

| | | |
|---|---|---|
| 1,601,938 | Campbell | Oct. 5, 1926 |
| 2,444,848 | Purvin | July 6, 1948 |
| 2,636,026 | Nelson | Apr. 21, 1953 |
| 2,720,447 | Jones | Oct. 11, 1955 |
| 2,746,605 | Baum | May 22, 1956 |
| 2,846,425 | Hogan et al. | Aug. 5, 1958 |
| 2,854,320 | Fields | Sept. 30, 1958 |
| 2,878,240 | Schmerling | Mar. 17, 1959 |
| 2,885,389 | Schappert | May 5, 1959 |
| 2,903,344 | Rollman et al. | Sept. 8, 1959 |